United States Patent [19]
Bruun et al.

[11] 3,959,005
[45] May 25, 1976

[54] METHOD FOR MANUFACTURING WOOD MATERIAL BOARDS

[76] Inventors: Henrik Bruun; Heikki Savikko, both of Abo Akademi, Turku, Finland

[22] Filed: Aug. 19, 1974

[21] Appl. No.: 498,724

[30] Foreign Application Priority Data

Aug. 21, 1973 Finland .................... 2603/73

[52] U.S. Cl. ............................................. 106/163 R
[51] Int. Cl.² ........................................... C08L 1/02
[58] Field of Search ................... 106/162, 163, 123; 162/159, 158, 166, 164; 260/96.5, 124, 96.5 C

[56] References Cited
UNITED STATES PATENTS

| | | | |
|---|---|---|---|
| 1,953,832 | 4/1934 | Sandell | 162/158 |
| 2,098,082 | 11/1937 | Bowen | 162/166 |
| 2,742,450 | 4/1956 | Yost | 260/96.5 U |
| 2,965,436 | 12/1960 | de Domenico et al. | 162/164 R |

*Primary Examiner*—Theodore Morris
*Attorney, Agent, or Firm*—McGlew and Tuttle

[57] ABSTRACT

Improved method of making wood composition boards is provided wherein wood raw materials, such as wood shavings, are pressed into boards and heated at a temperature of 180° – 250°C after having been treated with a urea bonding and flame-proofing agent which has been pre-reacted with a catalyst which is either a water soluble salt containing non-precious metal, such as Li, Na, K, Ca, Al, Mg, Zn, Fe, Co, Sn or Pb, or a water-soluble mono- or disaccharide, or an organic amine, or a solution of these catalyts. catalysts.

13 Claims, No Drawings

METHOD FOR MANUFACTURING WOOD MATERIAL BOARDS

BACKGROUND OF THE INVENTION

1. Field of the Invention

The present invention concerns a method of manufacturing wood material boards of the chip board type; the term wood material denotes all kinds of wood based components such as shavings, sawdust, peels and peeling refuse, cardboard and paper cutting refuse etc.

2. Prior Art

In conventional methods, these wood components are bonded into boards by means of heat hardened glue. The glues are usually so called synthetic resins that are introduced into the wood based raw material as precondensates. It is known also to use only urea to bond cellulosic pulp and wood components. At the same time urea has been found to reduce inflammability to various degrees depending on the amount of urea used. The advantage of the method employing urea in comparison with conventional methods is in the price of the bonding component and its simultaneous effect on inflammability and smoke formation.

The disadvantage of the prior art method employing urea is the slowness of the chemical reactions connected with the bonding stage. The pressing time required by this prior art method is approximately fivefold in comparison with that of the conventional technique. Now it has, however, been found that this pressing time may be greatly shortened by the method of the present invention.

With the exception of the pressing stage, the manufacturing process of wood material boards is usually continuous. The pressing stage is the "bottle neck" of the method, i.e. the stage that determines the speed of the preceeding and subsequent manufacturing stages. Therefore, steps that shorten the time required for pressing are technically and economically desirable.

The primary aim of the pressing stage is to bring the raw material of the board into the desired shape and to cause the bond forming chemical reactions to occur by means of heat applied through the pressing plates. Of these, the latter part, i.e. the transfer of activating energy required by the reactions into the board is the slowest and therefore the most influential factor on the overall pressing time.

Thus, the time needed in the pressing stage depends on both the amount of energy required to activate the reactions and the speed with which this energy can be transferred into the raw material. In principle, the activating energy for a chemical reaction, i.e. the rate coefficient of the reaction at a given temperature, can be affected catalytically. The speed with which this amount of heat energy is transferred into the board material may best be influenced by the difference in temperature between the pressing plates and the board material.

The relatively long pressing time required in the method employing urea according to our Finnish Patent Application No. 2097/71, is a result of the chemical nature of the method. The reactions forming bonds between wood particles are the result of many separate reactions, the total activating energy required by all reactions which is fairly great.

By means of the method of the present invention, the characteristics of which are defined in the appended claims, the pressing time in the board manufacture method employing urea as a bonding agent may be greatly shortened. This is achieved by reducing the total activating energy of the reactions by means of catalysts according to the present invention, whereby the rate coefficients of reaction, when using conventional pressing temperature in the method, are substantially increased, and secondly by causing the urea reactions to occur partially under the influence of heat before the urea is sprayed on the wood material, whereby the time required by these prereactions can be subtracted from the pressing time itself. The best result is achieved by a combination of these two methods whereby the reaction mixture is prepared from urea by heating it with the catalysts before spraying onto the wood material. The pressing time of the known method is from 1 to 10 minutes/board thickness in mm. In the method according to the present invention the pressing time is from 20 to 50 seconds/board thickness in mm.

DESCRIPTION OF THE INVENTION

The prereacted mixture is prepared for example in the following manner: urea and the catalysts are dissolved into water so that the resulting solution contains 50 per cent by weight of urea. The solution is then heated until ammonia starts to form indicating the decomposition of urea. The time required for heating and the final temperature of the mixture depend on each other and on the catalyst used. At the point of ammonia formation the hot reaction mixture is sprayed by conventional spraying techniques giving rise to a small drop size onto the wood raw material. The resulting material is then formed into boards and introduced into a heat press where the final chemical reactions leading to cross bonding between wood particles take place. The pressing takes place at a temperature of 180° to 250°C. The pressing time depends on the pressing temperatures, and is for the above temperatures 50 secs/mm to 20 secs/mm.

The catalysts suitable for the method of the present invention are found in three chemically different groups of substances. The first catalytically active group of substances is composed of water soluble salts of some ordinary non-precious metals and combinations of these. Such non-precious metallic elements are Li, Na, K, Ca, Al, Mg, Zn, Fe, Co, Sn and Pb. The second group contains water soluble mono- and disaccharides or substances containing them, e.g. sulphite waste liquors. The third group contains organic amines, especially tertiary amines, e.g. triethylenediamine, triethylamine, tetramethylene diamine, hexamethylene diamine and hexamethylene tetramine.

Catalysts influence even when added 0.1 per cent by weight (calculated on dry wood material), but usually the best result is obtainable with an amount of 1 to 3 per cent. A very good result is obtained with solutions of catalysts in which case the total amount is 1 to 3 per cent. Experiments have also shown that the influence of different metal salts is approximately similar so that it is possible always to use the most advantageously obtainable salt.

The following examples illustrate the application possibilities of the method:

EXAMPLE 1

A 50 per cent by weight water solution of urea is prepared. 0.05 parts of $MgCl_2$ (or another of the above salts) calculated on the amount of urea is added to the solution. The solution is heated and stirred at the same time up to and not exceeding the temperature at which the decomposition of urea starts. This decomposition point is indicated by the liberation of ammonia. Immediately after this, the reaction solution is sprayed onto sawdust. The material is formed into boards and pressed at 200°C. Thus, the amount of urea introduced into the wood raw material is about 20 per cent of the wood raw material. Pressing time is 40 secs/board thickness mm.

Board characteristics of resultant wood material board

Volume weight = 800 kg/m$^3$
Lateral tensile strength = 3.5 kp/cm$^2$
Thickness swelling 2h = 5%

EXAMPLE 2

Procedure as in Example 2 is followed except that a corresponding amount of monosaccharide or sulphite waste liquor containing these substances is used as catalyst.

Board characteristics

Volume weight = 800 kg/m$^3$
Lateral tensile strength = 4.0 kp/cm$^2$
Thickness swelling 2 h = 4%

EXAMPLE 3

Procedure as in Example 1 is followed except that hexamethylene tetramine is used as catalyst. Characteristics as in Example 2 for the resultant wood material board.

EXAMPLE 4

Procedure as in Example 2 is followed except that the pressing temperature is 220°C and the pressing time is 30 secs/mm. Characteristics as in Example 2 for the resultant wood material board.

EXAMPLE 5

This example illustrates the use of a mixture of catalysts. Calculated on the amount of urea in a 50 per cent by weight water solution of urea 0.025 parts ZnCl$_2$ and a corresponding amount of sugar substances of sulphite waste liquor is added. The same procedure is followed as in Example 1 except that the pressing temperature is 220°C and the pressing time is 20 secs/mm.

Board characteristics of resultant wood material board

Volume weight = 800 kg/m$^3$
Lateral tensile strength = 5.0 kp/cm$^2$
Thickness swelling 2 h = 3%.

We claim:

1. In a method of manufacture of wood material boards with urea as bonding agent, the improvement wherein to accelerate the method, urea is prereacted in a mixing reactor in the presence from about 1 to about 3% by weight based upon the wood material of a catalyst before it is sprayed into the wood raw material, said catalyst being selected from the group consisting of (a) water soluble salt of a non-precious metal, (b) water soluble mono- or disaccahride, (c) organic amine, and (d) a solution of (a), (b) or (c), and thereafter the activated resultant reaction mixture of urea is introduced into the wood based raw material and the material pressed into boards at a temperature of 180° to 250°C.

2. Improved method according to claim 1, wherein a 40 to 70 percent by weight water solution of urea containing up to 0.2 parts of catalyst calculated on the weight of urea, is heated and stirred until the urea starts to decompose, liberating ammonia, and thereafter the solution is immediately sprayed into said wood raw material.

3. Improved method according to claim 1, wherein said catalyst comprises at least one water soluble salt of Li, Na, K, Ca, Al, Mg, Zn, Fe, Co, Sn or Pb.

4. Improved method according to claim 1, wherein said catalyst comprises sulphite waste liquor containing water soluble mono- or disaccharide.

5. Improved method according to claim 1, wherein said catalyst comprises a tertiary amine selected from the group consisting of triethylene diamine, triethylamine, tetramethylene diamine, hexamethylene diamine and hexamethylene tetramine.

6. Improved method according to claim 2, wherein said catalyst comprises at least one water soluble salt of Li, Na, K, Ca, Al, Mg, Fe, Co, Sn or Pb.

7. Improved method according to claim 2, wherein said catalyst comprises sulphite waste liquor containing water soluble mono- or disaccharide.

8. Improved method according to claim 2, wherein said catalyst comprises a tertiary amine.

9. Improved method according to claim 2, wherein said catalyst comprises triethylene diamine.

10. Improved method according to claim 2, wherein said catalyst comprised triethylamine.

11. Improved method according to claim 2, wherein said catalyst comprises tetramethylene diamine.

12. Improved method according to claim 2, wherein said catalyst comprises hexamethylene diamine.

13. Improved method according to claim 2, wherein said catalyst comprises hexamethylene tetramine.

* * * * *